(12) United States Patent
Cinquemani et al.

(10) Patent No.: US 10,995,436 B2
(45) Date of Patent: May 4, 2021

(54) MAKING A NONWOVEN FROM FIBERS

(71) Applicants: REIFENHÄUSER GMBH & CO. KG MASCHINENFABRIK, Troisdorf (DE); MANN+HUMMEL GMBH, Ludwigsburg (DE)

(72) Inventors: Claudio Cinquemani, Cologne (DE); Detlef Frey, Niederkassel (DE); Stefan Orendt, Neudrossenfeld (DE); Thomas Pemsel, Ludwigsburg (DE)

(73) Assignees: REIFENHAEUSER GMBH & CO. KG MASCHINENFABRIK, Troisdorf (DE); MANN + HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 16/476,125

(22) PCT Filed: Feb. 23, 2018

(86) PCT No.: PCT/EP2018/054545
§ 371 (c)(1),
(2) Date: Jul. 5, 2019

(87) PCT Pub. No.: WO2018/177660
PCT Pub. Date: Oct. 4, 2018

(65) Prior Publication Data
US 2020/0024780 A1    Jan. 23, 2020

(30) Foreign Application Priority Data

Mar. 28, 2017 (EP) ..................... 17163369

(51) Int. Cl.
*B29C 71/02* (2006.01)
*B32B 37/06* (2006.01)
(Continued)

(52) U.S. Cl.
CPC ......... *D04H 3/147* (2013.01); *B29C 71/0081* (2013.01); *B32B 38/004* (2013.01);
(Continued)

(58) Field of Classification Search
CPC ..... B29C 71/0081; B29C 71/02; B32B 37/06; B32B 38/0008; B32B 38/0036;
(Continued)

(56) References Cited

U.S. PATENT DOCUMENTS 3,811,988 A    5/1974   Fleissner
6,632,386 B2  10/2003  Shelley
(Continued)

FOREIGN PATENT DOCUMENTS

GB         1141363 B    1/1969

*Primary Examiner* — Leo B Tentoni
(74) *Attorney, Agent, or Firm* — Andrew Wilford

(57) ABSTRACT

The invention relates to a method for producing a nonwoven fabric from fibres, wherein the fibres are spun by means of at least one spinneret, are cooled and then deposited on a collection device to form a nonwoven web. The nonwoven web undergoes hot fluid bonding during at least two consecutive bonding steps. In a first bonding step, the surface of the nonwoven web is subjected to a hot fluid and, in a second bonding step, the surface of the nonwoven web is also subsequently subjected to a hot fluid and, in addition and at the same time, surface pressure is exerted on the nonwoven web.

12 Claims, 3 Drawing Sheets

(51) Int. Cl.
*D01D 5/088* (2006.01)
*D01D 5/30* (2006.01)
*D01D 5/32* (2006.01)
*D01D 5/34* (2006.01)
*D01F 8/06* (2006.01)
*D02J 1/22* (2006.01)
*D04H 3/14* (2012.01)
*D04H 3/16* (2006.01)
*D06M 10/02* (2006.01)
*D04H 3/147* (2012.01)
*D04H 1/558* (2012.01)
*B29C 71/00* (2006.01)
*B32B 38/00* (2006.01)

(52) U.S. Cl.
CPC ...... *B32B 38/0008* (2013.01); *B32B 38/0036* (2013.01); *D04H 1/558* (2013.01); *D04H 3/163* (2013.01)

(58) Field of Classification Search
CPC ........ B32B 38/004; D01D 5/088; D01D 5/30; D01D 5/32; D01D 5/34; D01F 8/06; D02J 1/22; D04H 3/14; D04H 3/147; D04H 3/16; D04H 3/163; D06M 10/02
USPC .... 264/103, 172.13, 172.14, 172.15, 172.17, 264/172.18, 210.8, 211.12, 211.14, 264/211.15, 211.17, 211.18, 211.2, 234, 264/237, 466, 484; 156/181, 229, 244.24, 156/273.1
See application file for complete search history.

(56) References Cited

U.S. PATENT DOCUMENTS

| | | |
|---|---|---|
| 7,922,849 B2 | 4/2011 | Sommer |
| 2003/0049397 A1 | 3/2003 | Singer |
| 2010/0064491 A1* | 3/2010 | Dumas ............... D04H 3/14 28/100 |
| 2010/0159770 A1* | 6/2010 | Walser ............... D04H 1/48 442/335 |

* cited by examiner

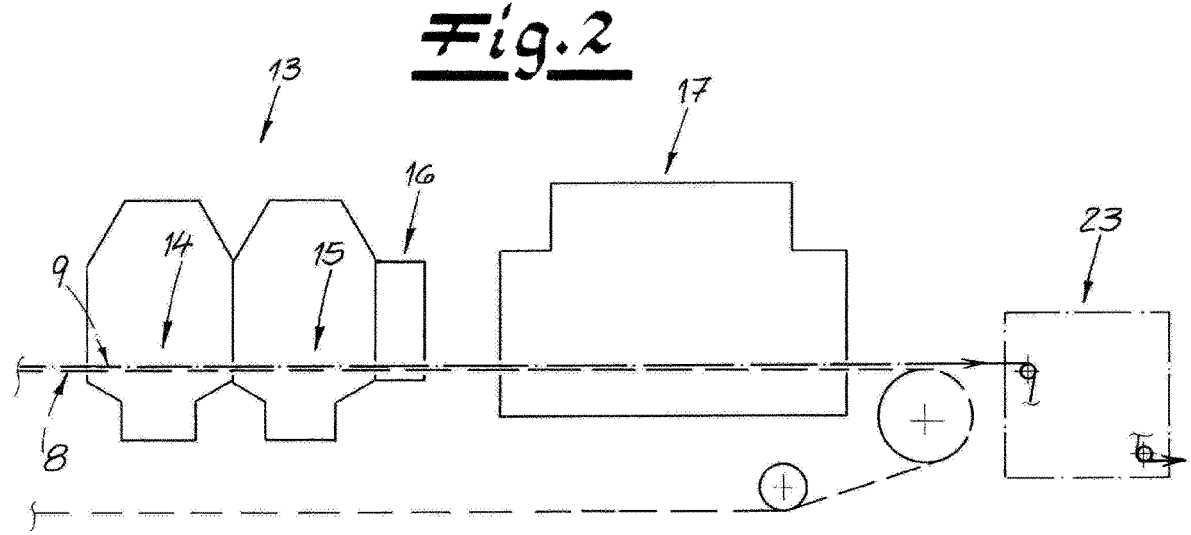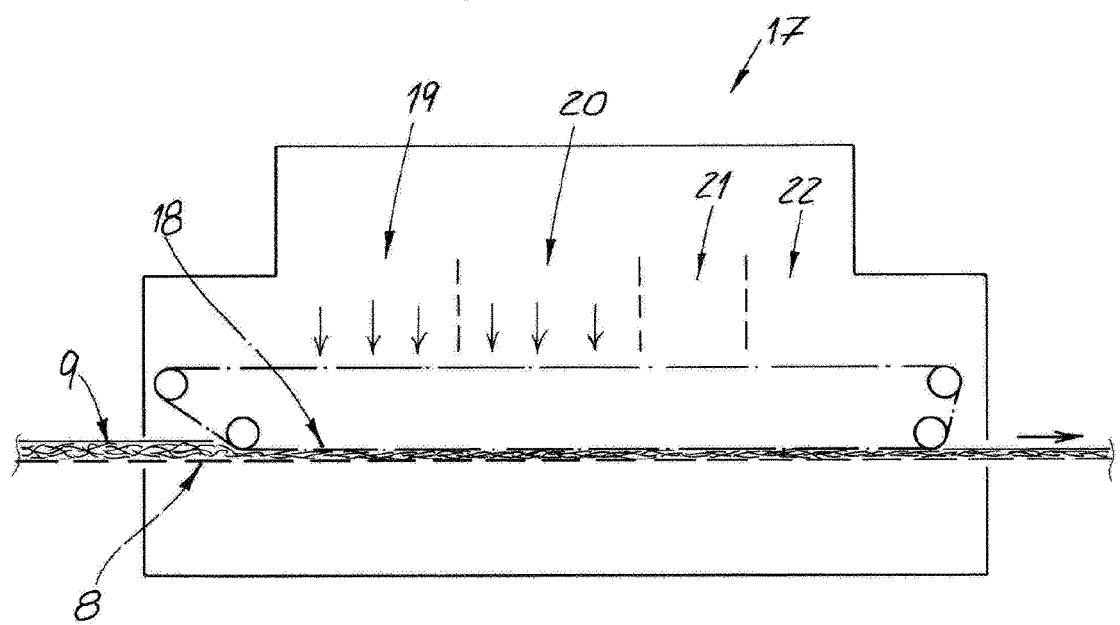

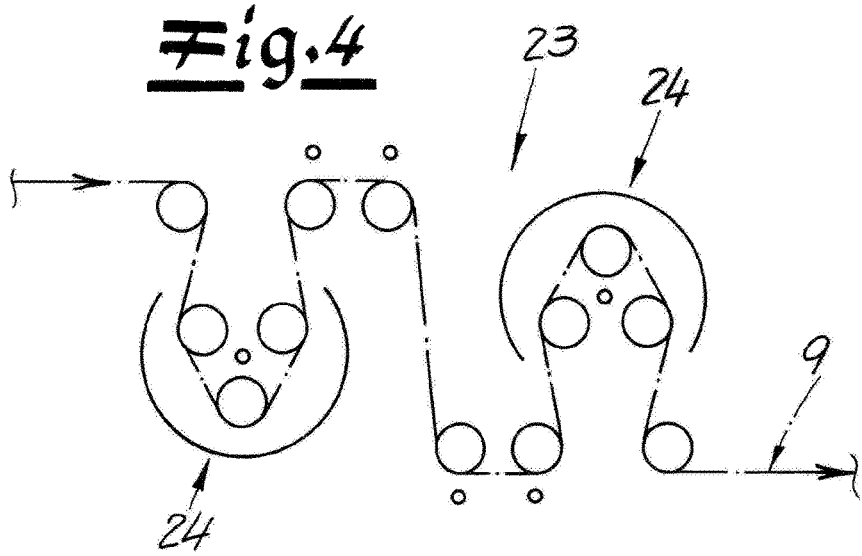
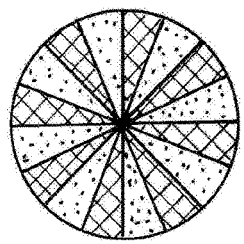
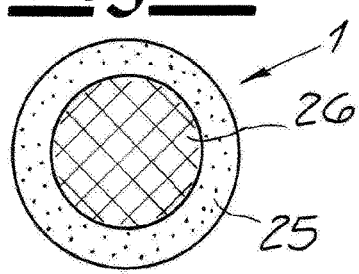
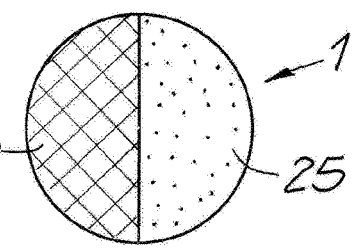
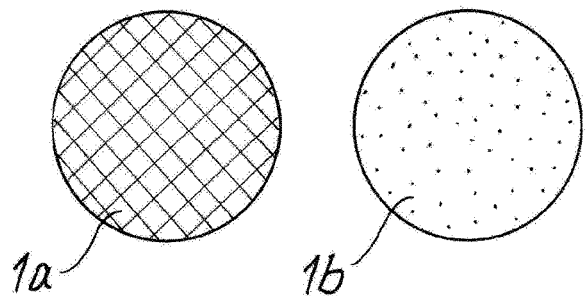

MAKING A NONWOVEN FROM FIBERS

CROSS REFERENCE TO RELATED APPLICATIONS

This application is the US-national stage of PCT application PCT/EP2018/054545 filed 23 Feb. 2018 and claiming the priority of European patent application 17163369.6 itself filed 28 Mar. 2017.

The invention relates to a method of making a nonwoven fabric from fibers, particularly of thermoplastic, in which the fibers are spun by at least one spinneret, subsequently cooled, and then deposited on a conveyor to form the nonwoven web. The invention further relates to an apparatus for making this nonwoven fabric.

Various versions of methods and apparatuses of the above-described type are known from practice. However, many of these known methods and apparatuses have limitations when it comes to making voluminous nonwoven fabrics of low density, which must have sufficient stiffness while also being permeable. The rigid and permeable nonwoven fabrics made by the known methods are usually characterized by being quite thin and an undesirably highly dense.

In contrast, the object of the invention is to provide a method of the above-described type with which nonwoven fabric can be made from fibers that have a high volume and low density on the one hand and are sufficiently rigid and permeable on the other. Another object of the invention is to provide a corresponding apparatus for making such nonwoven fabrics.

To attain this object, the invention teaches a method of making a nonwoven fabric from fibers, particularly of thermoplastic, where the fibers are spun by at least one spinneret, subsequently cooled by at least one cooler, and then deposited on a conveyor to form a nonwoven web, and the nonwoven web undergoes hot-fluid consolidating in at least two successive consolidating steps, in that in a first consolidating step a hot fluid, particularly hot air, is applied to the surface of the nonwoven web, and in a second consolidating step a hot fluid, particularly hot air, is subsequently applied to the surface of the nonwoven web, preferably in a dual-belt furnace, with pressure being exerted additionally to the surface of the nonwoven web.

According to an especially recommended embodiment of the invention, the nonwoven web undergoes hot-fluid consolidating in two successive consolidating steps, a hot fluid, particularly hot air, being applied to the surface of the nonwoven web in a first consolidating step, and a hot fluid, particularly hot air, being subsequently applied to the surface of the nonwoven web in a second consolidating step, preferably in a dual-belt furnace, with pressure being exerted additionally to the surface of the nonwoven web. It is recommended that the surface pressure that is exerted on the nonwoven web occur with a force of greater than 2 Pa, preferably greater than 3 Pa, and more preferably greater than 4 Pa. Advantageously, the surface pressure is exerted on the nonwoven web with a force of between 5 and 15 Pa, preferably between 5 and 10 Pa.

One recommended embodiment of the invention is characterized in that the fibers are spun as multicomponent fibers, particularly as bicomponent fibers and, in particular, have a segmented pie configuration, or in that the fibers are spun as a mixture of fibers from at least two different types of fiber. Preferably, multicomponent fibers or bicomponent fibers are used in which a component constituting greater than 50% by weight, preferably greater than 55% by weight of the total fiber, preferably consisting of polyolefin and very preferably of polypropylene.

It lies within the scope of the invention for the conveyor on which the fibers are deposited to form the nonwoven web to be a mesh belt. According to an especially recommended embodiment of the method according to the invention, the fibers deposited on the conveyor or on the mesh conveyor belt are fed directly to hot-fluid consolidating without prior preconsolidating of the nonwoven web with a pair of rollers, particularly with a pair of compaction rollers and/or with a temperature-controlled pair of press rollers. In principle, however, a pair of rollers could also be interposed for preconsolidating.

According to an especially recommended embodiment of the invention, two consolidating steps are provided for surface hot-fluid consolidating of the nonwoven web. Advantageously, the first surface hot-fluid consolidating is performed on the conveyor or mesh conveyor belt on which the fibers were deposited. Preferably, the first hot-fluid consolidating takes place as a preconsolidating in a tunnel furnace in which hot fluid or hot air is applied to the surface of the nonwoven web. During this initial hot-fluid consolidating, it is recommended that a fluid temperature be employed that is below the melting point of the highest-melting component of the fibers and at which at least one lower-melting component—in bicomponent fibers, the lower-melting component of the bicomponent fibers, is fused or melted. As a result, these fibers connect to the adjacent fibers at the contact points. This results in a transportable nonwoven web composite that is then fed to the second consolidating step. It is recommended that the first consolidating step and/or the tunnel furnace have at least two heating zones, preferably just two heating zones. It has proven advantageous for at least one, preferably only one, cooling zone to be provided downstream from these heating zones that preferably has a length of from 0.2 to 6 m, very preferably a length of from 0.2 to 3 m, and especially preferably a length of from 0.2 to 2 m. Advantageously, a hot fluid, particularly hot air, with an inflow rate of from 0.2 to 15 m/s, preferably from 1 to 5 m/s, and very preferably from 1 to 3 m/s, flows against the nonwoven web in the first consolidating step or during initial hot-fluid consolidating.

It lies within the scope of the invention for the nonwoven web to be introduced into the second consolidating step subsequent to the initial hot-fluid consolidating and for the surface of the nonwoven web to be treated here by a hot fluid, particularly hot air, and for pressure to be exerted additionally to the surface of the nonwoven web. This second consolidating step is advantageously carried out by at least one dual-belt furnace, preferably by only one dual-belt furnace. It also lies within the scope of the invention for the final consolidating and calibration of the nonwoven web to take place in this dual-belt furnace. Recommendably, the nonwoven web is clamped between two circulating continuous belts or screen belts in the dual-belt furnace, particularly between a conveyor belt and a height-adjustable calibration belt arranged over same. According to one embodiment of the invention, the conveyor belt is the mesh conveyor belt. With the aid of these two screen belt or continuous belts, pressure is applied to the surface of the nonwoven web, which is simultaneously flowed through by the hot fluid, more particularly the hot air. Preferably, a fluid temperature is used in the second consolidating step or in the dual-belt furnace that lies below the melting point of the highest-melting component of the fibers. It is expedient if at least one lower-melting component of the fibers, in bicomponent fibers, the lower-melting component, is fused or melted. It is recommended that a hot fluid, particularly hot air, with an inflow rate of 0.2 to 15 m/s, preferably from 1 to 5 m/s, and very preferably from 1 to 3 m/s, flow against the nonwoven web in the second consolidating step or in the dual-belt furnace. It has proven advantageous if the second consolidating step or the dual-belt furnace has a plurality of, preferably individually controllable, heating zones. It lies within the scope of the invention for the heating zones to each be flowed through separately from above and/or from below. According to a preferred embodiment of the invention, at least one cooling zone is downstream from the heating zones, and preferably two cooling zones are downstream from the heating zones, in order to cool the nonwoven web again. According to a tried-and-true embodiment of the invention, the temperature of the hot-fluid or hot air for the first hot fluid consolidating and/or for the second hot-fluid consolidating is at least 100° C., preferably greater than 100° C. and preferably 120 to 160° C., very preferably greater than 130° C.

One especially recommended embodiment of the method according to the invention is characterized in that the nonwoven web is electrically charged subsequent to the hot-fluid consolidating and preferably subsequent to the second consolidating step and/or subsequent to the second hot-fluid consolidating. The electrical charging is advantageously performed after the above-described cooling of the nonwoven web in the context of the second hot-fluid consolidating. The electrical charging of the nonwoven web is recommendably carried out by guiding the nonwoven web through a static electrical field. One recommended design variant is characterized in that the electrical-charge unit for charging the nonwoven web has two to three charging bars at 30 kV each. Advantageously, at least one aspirator is in the vicinity of the electrical-charge unit with which the ozone generated at the high voltages can be extracted, which is then advantageously fed to an ozone decomposer. In this ozone decomposer, the ozone is converted back to oxygen.

One very preferred embodiment that is of very special importance in the context of the invention is characterized in that the fibers are spun with the spinneret as continuous filaments and that the nonwoven web is made as a spun-consolidated nonwoven by a spunbond process. With respect to this preferred embodiment, in the embodiments described above and below, the term "fibers" can also be replaced in each case by "continuous filaments" or "filaments." It lies within the scope of the invention for the continuous filaments to be spun by at least one spinneret, then cooled with the aid of at least one cooler, then stretched by at least one stretcher, and for the stretched continuous filaments to be deposited on a conveyor, preferably on a mesh conveyor belt, to form the nonwoven web or spunconsolidated nonwoven. This nonwoven web then undergoes the hot-fluid consolidating.

According to an especially recommended embodiment of the method according to the invention, continuous filaments are made in the form of multicomponent filaments, preferably in the form of bicomponent filaments. One very preferred embodiment of the method according to the invention is characterized in that the multicomponent filaments or bicomponent filaments are spun in a segmented pie configuration. In particular, however, the multicomponent filaments or bicomponent filaments can also have a core/sheath configuration and/or a side-by-side configuration. In principle, mixtures of the different configurations of the bicomponent filaments or multicomponent filaments can also be used. It lies within the scope of the invention for the components of the multicomponent filaments or the two components of the bicomponent filaments to have different melting points.

One embodiment of the invention that has proven to be very advantageous is characterized in that multicomponent filaments or bicomponent filaments are used in which one component constitutes greater than 50% by weight, preferably greater than 55% by weight, more preferably greater than 60% by weight %, and very preferably greater than 65% by weight of the overall filament. According to a recommended embodiment of the invention, the proportion of one component of the multicomponent filaments or bicomponent filaments is from 65 to 75% by weight.

One very preferred embodiment of the method according to the invention is characterized in that at least one component, preferably both or all components of the multicomponent filaments or bicomponent filaments, consists or consist of a polyolefin. Advantageously, this polyolefin is a polypropylene. Polyolefin blends can also be used for the components of the continuous filaments. According to one embodiment of the invention, the terms "polyolefin" and "polypropylene" also include corresponding blends of polyolefins or of polypropylenes or copolymers of polyolefins or of polypropylenes.

According to one embodiment of the invention, the continuous filaments are spun as a mixture of continuous filaments of at least two different types of continuous filament. Advantageously, the plastics of at least two types of continuous filament have different melting points. The filaments of one filament type can be used as binding fibers that are melted during subsequent consolidating or hot-fluid consolidating, or they are melted more than the other or remaining filaments. The mixed types of filament can be both monocomponent filaments and multicomponent filaments.

It lies within the scope of the invention for multicomponent filaments, preferably bicomponent filaments, to be spun as continuous filaments by at least one spinneret and for these to then be cooled by at least one cooler. One especially preferred embodiment of the method according to the invention is characterized in that at least one monomer extractor for extracting monomers or for extracting spinning smoke is between the spinneret and the cooler. The cooler is advantageously subdivided into at least two, preferably two cooling chamber portions, in which cooling chamber portions the continuous filaments are exposed to cooling air of different temperature. After passing through the cooler, the continuous filaments are introduced into a stretcher. It lies within the scope of the invention for the continuous filaments to be passed through a closed subassembly of cooler and stretcher in which no further fluid supply or air supply takes place apart from the supply of the cooling fluid or cooling air in the cooler.

One highly recommended embodiment of the invention is characterized in that the continuous filaments are passed through at least one diffuser between the stretcher and the conveyor, particularly the mesh conveyor belt. According to a very preferred embodiment, at least two diffusers, particularly two diffusers, are between the stretcher and the conveyor, particularly mesh conveyor belt. It is expedient for an ambient air inlet gap for the introduction of ambient air to be provided between the two diffusers. It lies within the scope of the invention for the two diffusers to have no further air supply apart from the ambient air inlet gap.

During the spunbond process for making the continuous filaments according to the invention, the filament fineness can be adjusted in a targeted manner through separate regulation of the cooling air and drawing air, and air permeability of the nonwoven web can also be influenced in this way. Preferably, the stretched continuous filaments are deposited on a mesh conveyor belt that runs at a speed between 10 to 150 m/min. The mesh conveyor belt is advantageously a continuous belt.

It lies within the scope of the invention for spunconsolidated nonwovens or nonwoven webs having a weight per unit area of between 40 and 1000 g/m$^2$, preferably between 40 and 250 g/m$^2$, to be made with the method according to the invention. According to a recommended design variant, a sensor is provided with which the air permeability of the nonwoven web can be determined, advantageously online. This sensor makes it possible to detect errors or deviations from a desired value immediately at the nonwoven web made and to correct them accordingly. In principle, the air permeability of the nonwoven web made can also be determined offline.

To solve the technical problem, the invention also teaches an apparatus for making a nonwoven fabric from fibers, preferably of thermoplastic, wherein at least one spinneret for spinning the fibers, at least one cooler for cooling the fibers, and at least one conveyor, preferably a mesh conveyor belt, for depositing the fibers to form the nonwoven web is provided, wherein at least one consolidating step for the hot-fluid consolidating of the nonwoven web is present, and wherein this consolidating step is instantiated with the proviso that surface of the nonwoven web can be treated with a hot fluid, particularly hot air, whereby pressure can be additionally applied to the surface of the nonwoven web. According to an especially recommended embodiment of the invention, at least two, preferably two consolidating steps for hot-fluid consolidating of the nonwoven web are present, wherein the first consolidating step comprises at least one circulating-air/tunnel furnace for the surface treatment with a hot fluid or hot air to the nonwoven web being conveyed on the mesh conveyor belt, and wherein the second consolidating step comprises at least one dual-belt furnace in which the nonwoven web is passed between two circulating belts or continuous belts and a hot fluid or hot air can be applied to the surface of the nonwoven web and in which, in addition and at the same time, surface pressure can be applied to the nonwoven web, particularly with the two circulating belts or continuous belts. According to an especially recommended embodiment of the invention, the screen belt zone of the mesh conveyor belt between the region in which the continuous filaments are deposited and the first consolidating step is configured so as to be free of compaction rollers and press rollers. It lies within the scope of the invention for an electrical-charge unit for electrically charging the consolidated nonwoven web to be provided downstream from the two consolidating steps.

With the method according to the invention and the apparatus according to the invention, nonwoven webs or spunconsolidated nonwovens can be preferably made from continuous filaments which have a weight per unit area of between 40 and 1000 g/m$^2$, preferably a weight per unit area of between 40 and 250 g/m$^2$. These spunconsolidated nonwovens are characterized by especially advantageous properties. It lies within the scope of the invention for a spunconsolidated nonwoven made according to the invention to be part of a laminate composed of a plurality of layers, in which case at least one layer or a portion of the layers is likewise formed from spunconsolidated nonwovens or nonwoven webs. Meltblown nonwoven fabrics can be used here for this purpose, for example. According to one design variant, the laminate or assembly of layers can have a gradient of the fiber diameter or filament diameter relative to its thickness dimension. Such a laminate or assembly of layers can be made particularly by a plurality of spinning bars that are connected in succession. In addition, the invention also relates to a nonwoven of fibers, preferably made of thermoplastic, that was made particularly by a method as described above and/or with an apparatus as described above and that has a weight per unit area of between 40 and 250 g/m$^2$ and can be used for insulation and/or packaging.

The invention is based on the discovery that voluminous nonwoven webs or low-density spun-consolidated nonwovens can be made in a simple manner with the method according to the invention and with the apparatus according to the invention that are also characterized by outstanding stiffness and/or strength and have excellent permeability. The nonwoven webs or spunconsolidated nonwovens have an advantageously low abrasion and exhibit optimum elasticity. The method according to the invention is characterized by high productivity and can be carried out at relatively low cost. Furthermore, the apparatus according to the invention is advantageously has a construction that is neither complex nor costly.

The nonwoven fabrics or spunconsolidated nonwovens made according to the invention have optimum insulation properties and, particularly at densities of 50 to 500 kg/m3, show relatively low heat conduction with nonetheless sufficient mechanical resistance. These nonwoven fabrics or spunconsolidated nonwovens are therefore outstandingly suitable as components of cooler bags, microwave trays, containers for hot beverages, and the like. Further advantages of the nonwovens made according to the invention include their ease of folding and their advantageous soundproofing properties. Because of the optimum mechanical properties, and due to the stiffness of the nonwoven fabrics that can be achieved according to the invention, these can be advantageously used for packaging or as a component of packaging and as components of storage boxes and the like. Incidentally, the advantageous use of the nonwoven fabrics made according to the invention can also be employed here as a component of laminates. Such laminates include film-nonwoven-film laminates and similar laminates, for example. It is also worth mentioning that the nonwoven fabrics can be made in the context of the invention with a relatively uniform structure and are therefore also easy to print on. This facilitates their use for packaging and the like. Finally, the nonwoven fabrics or spunconsolidated nonwovens made according to the invention can also be used as components of filters. In summary, it should be noted that the nonwoven fabrics or spunconsolidated nonwovens made according to the invention are distinguished by a multiplicity of uses or possible uses.

The invention is explained in further detail below with reference to a schematic drawing, which illustrates only one embodiment. In the schematic figures:

FIG. 2 is a vertical section through the downstream portion of the apparatus according to the invention, FIG. 3 is a large-scale view of the detail shown at A [17] in FIG. 2;

FIG. 4 is a large scale view of the detail shown at B [23] in FIG. 2; and

Figure 1:
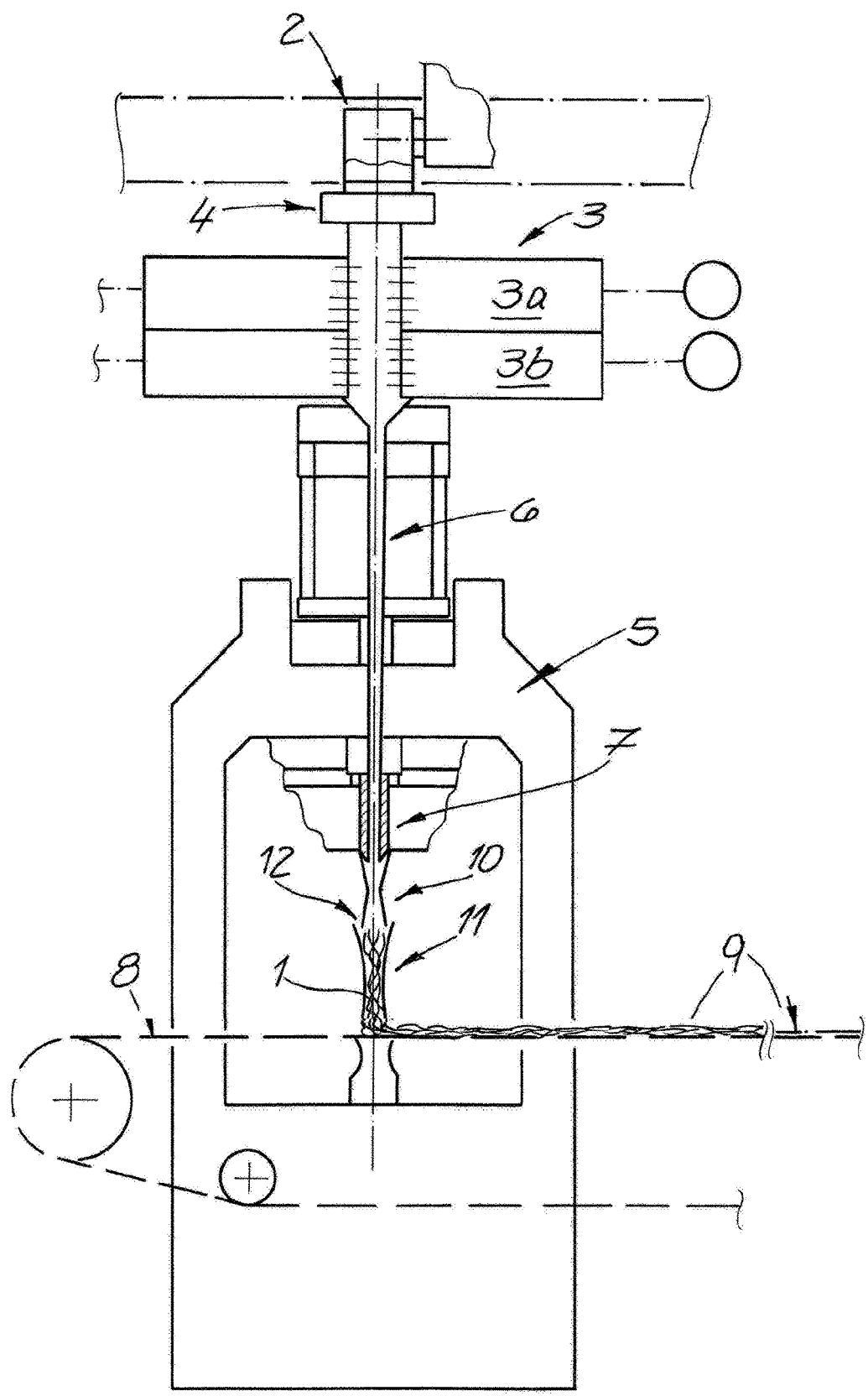
FIG. 1 is a vertical section through the upstream portion of an apparatus according to the invention.

FIGS. 5a, b, c, and d are sections through continuous or bicomponent filaments according to preferred embodiments of the invention.

The figures show an apparatus according to the invention for making spun-consolidated nonwovens from continuous filaments 1. According to a preferred embodiment of the invention, the continuous filaments 1 are made of thermoplastic and especially preferably of polyolefins. The apparatus shown in FIG. 1 is a spunbond apparatus for making spun-consolidated nonwovens from continuous filaments 1. With the apparatus according to the invention, the continuous filaments 1 are spun by a spinneret 2 and subsequently cooled in a cooler 3. According to a preferred embodiment and here, a monomer extractor 4 for extracting spinning vapors generated in this space is provided between the spinneret 2 and the cooler 3. Recommendably and here, the cooler 3 has two cooling chambers 3a and 3b that are one above the other or in the filament-travel direction in which cooling air of different temperatures is applied to the continuous filaments 1. A stretcher 5 downstream from the cooler 3 in the filament travel direction, and, preferably and here, has an intermediate passage 6 that converges in the direction of flow of the continuous filaments 1 as well as an adjoining stretch passage 7. According to a very preferred embodiment and here, the subassembly composed of the cooler 3 and the stretcher 5 is a closed unit to which no additional air is supplied apart from the cooling fluid or cooling air that is supplied to the cooler 3.

The continuous filaments 1 are deposited on a conveyor that is a mesh conveyor belt to form the nonwoven web 9. According to a recommended embodiment and here, the continuous filaments 1 are passed between the stretcher 5 and the mesh conveyor belt 8 through at least one diffuser 10, 11. Preferably and here, two successive diffusers 10 and 11 are provided in the flow direction of the continuous filaments 1. Recommendably and here, an ambient air inlet gap 12 is provided for introducing ambient air between the two diffusers 10, 11. Downstream from the diffusers 10, 11, the continuous filaments 1 are deposited on the mesh conveyor belt to form the nonwoven web 9. Preferably and here, the mesh conveyor belt 8 is a continuously circulating mesh conveyor belt 8.

Preferably and here, the nonwoven web 9 of the continuous filaments 1 that is deposited on the mesh conveyor belt 8 is then passed through the first consolidating step or through the initial hot-fluid consolidating in the form of the tunnel furnace 13 without the use of compaction or press rollers. Preferably and here, a first surface treatment of the nonwoven web 9 with hot air takes place here on the mesh conveyor belt 8. Advantageously and here, hot air is applied from above to the surface of the nonwoven web 9 for this purpose, this hot air preferably having an inflow rate of 1 to 3 m/s and preferably a temperature that is lower than the higher-melting plastic component of the continuous filaments 1. Preferably and here, the first consolidating step or the tunnel furnace 13 has two heating zones 14 and 15 that follow each other in the travel direction of the nonwoven web 9 in which hot air is applied to the nonwoven web 9. Advantageously and here, the heating zones 14 and 15 are followed by a cooling zone 16.

According to a very preferred embodiment and here, after the first consolidating step or after passing through the tunnel furnace 13, the nonwoven web 9 is introduced into the second consolidating step or into second hot-fluid consolidating, which is instantiated as a dual-belt furnace 17. In this second consolidating step, or in the dual-belt furnace 17, a hot fluid, particularly hot air here, is applied to the nonwoven web 9, and pressure is additionally applied to the surface of the nonwoven web 9 at the same time. Preferably and here, this pressure is applied by a calibration belt 18 that preferably and here is height-adjustable relative to the mesh conveyor belt 8. Advantageously and here, the calibration belt 18 is also a continuous belt. The nonwoven web 9 is clamped, as it were, between the mesh conveyor belt 8 and the calibration belt 18, and a defined pressure is exerted on the nonwoven web 9. At the same time, hot air is applied to the nonwoven web 9 in the dual-belt furnace 17. The nonwoven web 9 is able to be impinged from above and/or from below with hot air. Preferably and here, the inflow rate of the hot air is 1 to 3 m/s, and the temperature of the hot air is advantageously lower than the melting temperature of the higher-melting plastic component of the continuous filaments 1. Recommendably and here, the dual-belt furnace 17 has two heating panels 19 and 20 that direct hot air against the nonwoven web 9. Preferably and here, two cooling panels 21 and 22 follow the heating panels 19 and 20 in the travel direction of the nonwoven web 9. Preferably, the two heating panels 19 and 20 are controlled individually and/or separately. In particular, the cooling panels 21 and 22 are provided for the purpose of cooling the nonwoven web 9 again before electrical charging and interrupting the shrinking process in a defined manner.

According to a preferred embodiment and here, an electrical-charge unit 23 for electrically charging the nonwoven web 9 is downstream from the second consolidating step, or downstream of the dual-belt furnace 17 in the travel direction. Here, the nonwoven web 9 is electrically charged by a plurality of electrical charging bars 24. A large-scale view of the electrical-charge unit 23 is shown in FIG. 4. Downstream of the electrical-charge unit 23 in the travel direction, the nonwoven web 9 is preferably wound up (not shown in the figures). It also lies within the scope of the invention for a sensor (not shown in the figures) to be provided in a suitable location, for example downstream of the electrical-charge unit 23 in the travel direction, with which the air permeability of the nonwoven web 9 can be determined, particularly online. As a result, errors or deviations from a set point are detected immediately on the nonwoven web 9, and a correction can be made directly by adjusting system parameters.

FIG. 5[a-c] shows preferred cross-sectional configurations of continuous filaments 1 made by the method according to the invention. FIGS. 5a, b, and c show cross-sectional configurations of bicomponent filaments used in accordance with a recommended embodiment of the invention. The segmented pie configuration shown in FIG. 5a is especially preferred in the context of the invention. In principle, however, the continuous filaments can also have the core/sheath configuration illustrated in FIG. 5b. Here, the first plastic component 25 forms the sheath of the continuous filament 1, and the second plastic component 26 forms the core. Another preferred embodiment is the side-by-side configuration of the continuous filaments 1 shown in FIG. 5c, in which the two plastic components 25 and 26 each fill one half (side) of the cross section. According to an especially preferred embodiment of the invention, the two plastic components 25, 26 are composed of at least one polyolefin, for example polypropylene. FIG. 5d shows cross-sectional configurations of two different continuous filaments 1a, 1b, which are part of a mixture of two different types of filament used according to one embodiment of the invention. The plastics of the two continuous filaments 1a and 1b preferably have different melting points. One of the types of continuous filament 1b can act here as a binder fiber component, in which case these continuous filaments 1b are melted or at least partially melted during consolidating or hot-fluid consolidating.

The invention claimed is:

1. A method of making a nonwoven fabric from thermoplastic fibers, the method comprising the steps of:
spinning the fibers with a spinneret as continuous filaments;
cooling the filaments with a cooler in a closed assembly also holding a stretcher;
stretching the cooled filaments in the stretcher in the closed assembly;
excluding from the assembly any further fluid supply or air supply apart from a supply of a cooling fluid in the cooler;
depositing the stretched filaments on a conveyor to form a nonwoven web;
in a first consolidating step applying a hot fluid to a surface of the nonwoven web; and
in a subsequent second consolidating step applying a hot fluid to the surface of the nonwoven web in a dual-belt furnace; and applying to the surface of the nonwoven web a pressure with a force greater than 2 Pa.

2. The method according to claim 1, wherein the filaments are spun as multicomponent, bicomponent segmented pie, or as a mixture of at least two different types of filaments.

3. The method according to claim 1, wherein the filaments are multicomponent filaments and have a component constituting more than 50% by weight of the total filament and consisting of a polyolefin.

4. The method according to claim 1, wherein the first hot-fluid surface consolidating is performed on the conveyor.

5. The method according to claim 3, wherein, in the first consolidating step a fluid temperature is employed that is below a melting point of a highest-melting component of the filaments and at which a lower-melting component of the filaments fuses or melts.

6. The method according to claim 1, further comprising the steps, after passing through the first consolidating step, of:
cooling the nonwoven web in a cooling zone;
thereafter conveying the cooled nonwoven web through the second consolidating step.

7. The method according to claim 6, further comprising the step of:
using a fluid temperature in the second consolidating step that lies below a melting point of a highest-melting component of the filaments.

8. The method according to claim 1, wherein in the first consolidating step or in the second consolidating step the hot fluid is flowed with an inflow rate of from 0.2 to 15 m/s against the nonwoven web.

9. The method according to claim 1, further comprising the step of:
cooling the nonwoven web after passing through the second consolidating step.

10. The method according to claim 1, further comprising the steps of:
electrically charging the nonwoven web after passing through the first and second consolidating steps; and
thereafter winding up the electrically charged nonwoven web.

11. The method according to claim 1, wherein the filaments are spun with the spinneret as continuous filaments, the conveyor is a mesh conveyor belt.

12. The method according to claim 1, wherein the pressure with a force of more than 2 Pa is applied by compression of the web between the belts of the dual-belt furnace.

* * * * *